M. M. DRESDNER.
BROILER.
APPLICATION FILED JUNE 8, 1909.
943,593.
Patented Dec. 14, 1909.
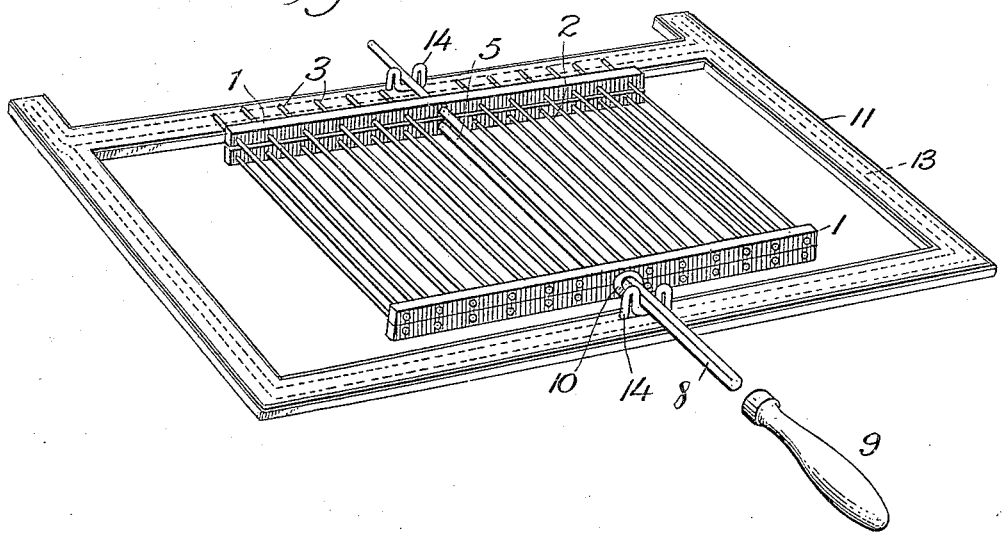
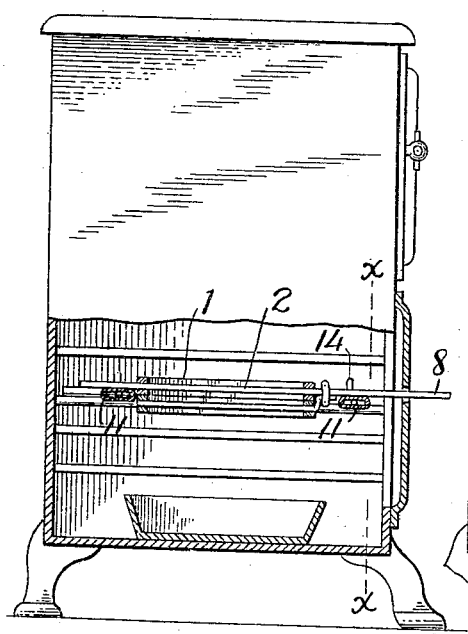
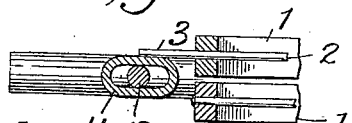
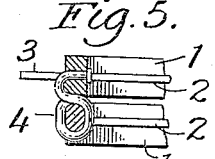
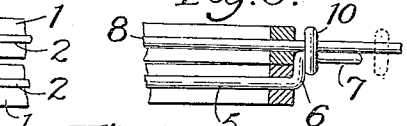
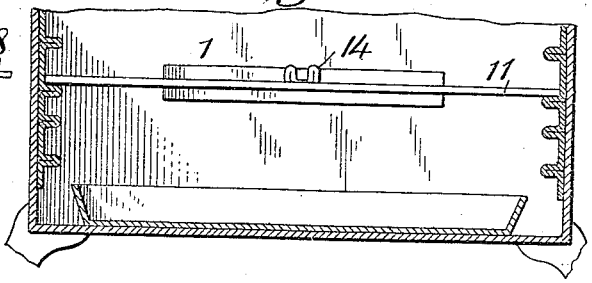
WITNESSES:
James L. Duhamel
F. Delabar
INVENTOR,
Morris M. Dresdner,
BY Victor J. Evans
ATTORNEY

UNITED STATES PATENT OFFICE.

MORRIS MURRAY DRESDNER, OF NEW YORK, N. Y.

BROILER.

943,593.  Specification of Letters Patent.  Patented Dec. 14, 1909.

Application filed June 8, 1909.  Serial No. 500,823.

*To all whom it may concern:*

Be it known that I, MORRIS MURRAY DRESDNER, a citizen of the United States, residing at New York, in the county of New York and State of New York, have invented new and useful Improvements in Broilers, of which the following is a specification.

The purpose of this invention is to devise a broiler particularly adapted for gas stoves and which may be used in ovens, said broiler being provided with a detachable handle, and contemplates a supporting frame upon which is placed the broiler when in use, said frame being adjustable upon the guides upon the walls of an oven in substantially the same manner as a grate or rest for bake pans and the like.

The invention consists of the details of construction, combinations of parts which hereinafter will be more particularly set forth, illustrated in the accompanying drawings and pointed out in the appended claims.

Referring to the drawings forming a part of the specification: Figure 1 is a perspective view of a broiler and adjunctive parts embodying the invention. Fig. 2 is a side view of a gas stove having a portion broken away and showing the broiler and adjunctive parts in section. Fig. 3 is a longitudinal section of the lower portion of the gas stove on the line $x$—$x$ of Fig. 2 looking to the left showing the position of the broiler and coöperating parts when in place. Fig. 4 is a vertical section of the rear portion of the broiler and supporting frame. Fig. 5 is a sectional view of the rear portion of the broiler showing the hinge connection between the members thereof. Fig. 6 is a sectional view of the front portion of the broiler showing the means for holding the members together.

Corresponding and like parts are referred to in the following description and pointed out in the views of the drawings by the same reference characters.

The broiler proper comprises complemental members of similar construction, each consisting of longitudinal bars 1 and transverse rods or wires 2, said members being hingedly connected in any manner to admit of the opening of the members to place meat, fish or other food therebetween to be broiled, toasted or the like. The transverse rods or wires of the upper member are extended a short distance in the rear of the rear bar as indicated at 3 to form supporting means for preventing tilting of the broiler when in operation. The projecting portions 3 may also serve as stops to engage the rear bar of the lower member so as to limit the opening of the broiler. Any means may be employed for hingedly connecting the members of the broiler and as shown short wires 4 are passed through openings in the rear bar of one member and are bent around the rear bar of the other member as indicated most clearly in Fig. 5. A wire or slender rod 5 is supported at or near its ends in the bars of the lower member and its front portion is bent upward as indicated at 6 thence outward as shown at 7 to form a catch piece. The bent or off-set portion 6 overlaps the joint formed between the front bars of the members, thereby serving, in a measure, to hold the members in place when closed and secured by means coöperating with the parts 7 and 8, as hereinafter more fully described. A stout wire or slender rod 8 is supported in the front and rear bars of the upper member and has its end portions projected. The front portion of the part 8 is doubled upon itself to form a stem to receive a detachable handle 9. A link 10 is slidable upon the stem of the stout wire or rod piece 7 to hold the members of the broiler closed. The stem of the part 8 is adapted to project through an opening in the door of an oven as indicated in Fig. 2, hence, the necessity for having the handle 9 detachable so that the opening in the oven door may be of a minimum size. The parts 5 and 8 are centrally disposed so as to equalize the weight upon the broiler.

A frame 11 is provided to form a support for the broiler, and may be constructed of sheet metal having edge portions recurved or folded as indicated most clearly in Fig. 4 and inclosing a reinforcing or stiffening wire 13. The frame 11 is of a size to fit within the oven of a gas stove or other form of cooking stove and slide upon the guides provided at opposite sides or ends of the oven, thereby admitting of the distance of the broiler from the source of heat being regulated. This is of special advantage in gas stoves where the burner occupies a fixed position, thereby enabling different kinds of food to be broiled or otherwise cooked, roasted or the like more or less rapidly. Lugs 14 are provided upon the front and rear bars of the supporting frame 11 to receive the projecting ends of the stout wire or rod 8 so as to fix the position of the broiler. The lugs are depressed in their upper ends and may be formed in any manner and consist of short pieces of wire doubled upon themselves and having their side members folded and secured in openings formed in the bars of the supporting frame.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

What I claim as new and desire to secure by Letters Patent is:

1. A broiler comprising similar members each consisting of front and rear bars and transverse rods or wires, means hingedly connecting the rear bars of the members, and a stout wire or rod passed centrally through the front and rear bars of one of the members and forming a handle and a projection for pivotally supporting the broiler, the transverse rods or wires of the member supporting said stout wire projecting rearwardly from the rear bar thereof to form supporting means and stops.

2. A broiler comprising companion members, each consisting of front and rear bars and transverse wires or rods, a wire supported in the front and rear bars of one of the members and having a rear portion extended and bent to overlap the joint formed between the two members when closed and engaging the front bars thereof, and having the bent portion thereof extended outward to form a catch-piece, a stem projecting forwardly from the other member, and a link slidable upon the stem and adapted to engage said catch-piece to hold the members of the broiler in position, when closed.

3. In combination, a supporting frame, lugs extended upwardly from the front and rear bars of said frame and depressed in their upper ends, a broiler comprising hingedly connected members, each member consisting of front and rear bars and transverse rods, the rods of one member extending from the rear bar thereof to engage the rear bar of the frame and hold the broiler steady, and a rod supported centrally in the front and rear bars of the broiler member having the rear projections and having its ends extended to engage the lugs of the supporting frame to admit of the broiler tilting, when the rear projections are disengaged from the rear bar of said supporting frame.

In testimony whereof I affix my signature in presence of two witnesses.

MORRIS MURRAY DRESDNER.

Witnesses:
JAMES F. DUHAMEL,
MAE W. CLINTON.